May 30, 1933.  K. H. SAUNDERS  1,911,716
MANUFACTURE OF MERCAPTOBENZTHIAZOL
Filed March 18, 1930
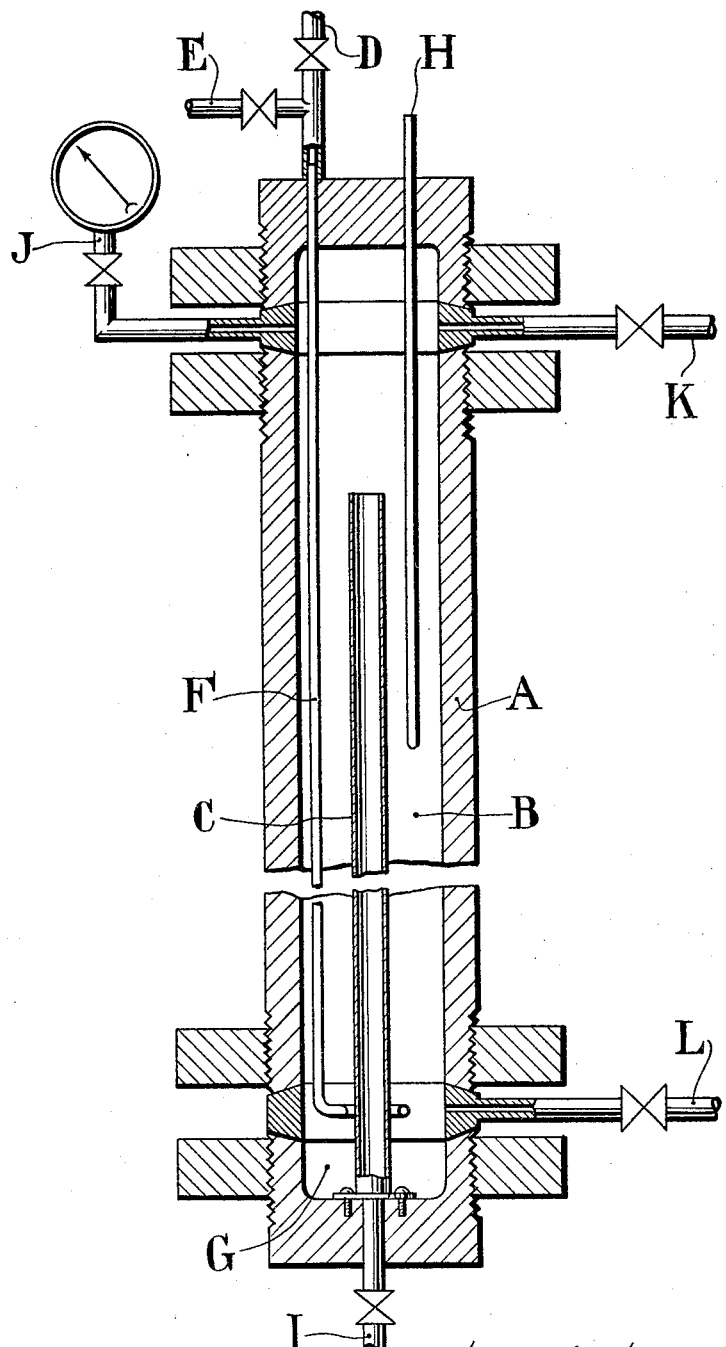
Kenneth Herbert Saunders
By K. P. McElroy Patented May 30, 1933

1,911,716

UNITED STATES PATENT OFFICE

KENNETH HERBERT SAUNDERS, OF MANCHESTER, ENGLAND, ASSIGNOR TO IMPERIAL CHEMICAL INDUSTRIES LIMITED, OF LONDON, ENGLAND

MANUFACTURE OF MERCAPTOBENZTHIAZOL

Application filed March 18, 1930, Serial No. 436,783, and in Great Britain March 26, 1929.

It is known to manufacture mercaptobenzthiazol by heating together in an autoclave a mixture of aniline, carbon disulphide and sulphur under pressure (preferably greater than 500 pounds per square inch) of the generated hydrogen sulphide. This process has certain disadvantages which can be readily appreciated by those familiar with the art of chemical manufacture. In the first instance it is necessary to heat and cool the reaction mixture rapidly, which is a difficult matter when working with large heavy walled pressure vessels at elevated temperatures. Further, the maintenance of the correct pressure is attained by blowing off a part of the generated hydrogen sulphide for which purpose a costly absorption apparatus of large dimensions is necessary since the blowing-off is intermittent. Lastly the size of batch which can be made in any given autoclave is not very large, as ample gas space must be left when charging.

I have now found that it is possible to carry out the type of reaction above referred to in a continuous manner whereby the method of manufacture is much improved and the difficulties are to a large extent overcome.

According to the present invention the method of carrying out reactions continuously in the liquid phase under increased pressure may be practiced by introducing the liquid or liquids under treatment, into a reaction chamber whence, on completion of the reaction, the liquid overflows into a second chamber disposed in the reaction chamber from which it is drawn off. The pressure is controlled by means of a body of gases at the top of said reaction chambers and in direct, free communication and in contact with both the said chambers.

When it is desired to manufacture mercaptobenzthiazol according to the present invention a solution of sulphur in carbon disulphide is mixed with aniline oil and introduced into a reaction vessel which is heated to 200–275° C., the admission of the mixture into the reaction vessel being so adjusted that the liquid in the reaction vessel overflows into a second chamber disposed in the reaction vessel as soon as the reaction is completed.

The present invention will be described in detail with reference to the accompanying drawing and which illustrates by way of example only, one way of carrying out the invention.

A tall cylindrical pressure-sustaining vessel, A, closed top and bottom, for instance by lens ring joints as shown, is heated by any suitable means to 200–275° C. Within this cylinder I make an annular space B by means of a second thin-walled cylinder fastened to the bottom cover and open at its upper end. Through the tubes E and D I pump in, in appropriately regulated proportions, a cold solution of sulphur in carbon disulphide and aniline oil. These mix in the tube F and pass down to the distributor G at the bottom of the converter thus entering the annular space B. The speed of entry is so adjusted that by the time the mixture overflows at the top of the central tube C reaction is complete at the prevailing temperature which is ascertained by the pyrometer H. The crude mercaptobenzthiazol thus formed is then forced out through the valve I cooled rapidly by being blown into an appropriate vessel and worked up in the usual manner.

Hydrogen sulphide is blown off from the valve K to an absorption column in order to maintain the desired pressure which, by allowing the hydrogen sulphide to accumulate, obviously may be of any predetermined value within the strength capacity of the apparatus. The operator reads the internal pressure from the gauge J. The valve L allows of emptying the annulus when desired and may also be used to free the chamber B from obstruction. It will at once be perceived that this apparatus overcomes the major difficulties inherent in the batch process, for rapid heating and cooling are attained, the absorption plant works continuously and is of modest dimensions while the pressure vessel can be worked to its utmost capacity.

It is to be understood that the present invention can be applied to other reactions which are carried out in the liquid phase under increased pressure. For instance, the manufacture of p-nitraniline from p-chloronitrobenzene and aqueous ammonia or of aniline from chlorobenzene and aqueous ammonia (with or without a catalyst) where the pressure set up is almost entirely the vapour pressure of the ammonia solution at the concentration and temperature selected for reaction, or the manufacture of ethylanilines where a solution of ethylalcohol in aniline with a neutral catalyst is forced through such a converter, the pressure being that due to the vapour pressure of the components together with that generated by a little ethylene which is usually formed.

If in any one or more particular reaction the substances under treatment are liable to corrode parts of the apparatus in contact with the reagents, these parts may be made of rustless steel or any other noncorrodible material.

What I claim and desire to secure by Letters Patent is:—

1. The method of producing mercaptobenzthiazol continuously in the liquid phase under substantially uniform superatmospheric pressure consisting in continuously introducing the reactants into a reaction liquid maintained at reaction temperature whence, on completion of the reaction, the liquid continuously overflows into an outlet and is drawn off.

2. Process of manufacturing mercaptobenzthiazol consisting in continuously introducing a solution of sulphur in carbon disulphide mixed with aniline oil into a reaction vessel heated to 200-275° C., and allowing the mixture on the completion of the reaction to continuously overflow into a second chamber disposed in the reaction chamber whence it is drawn off.

3. Process of manufacturing mercaptobenzthiazol consisting in continuously introducing a solution of sulphur in carbon disulphide mixed with aniline oil at the base of a cylindrical pressure sustaining vessel heated to 200-275° C., continuously causing the solution to rise in the said vessel and to overflow, when the reaction is complete, into a second cylindrical draw-off chamber disposed in the pressure sustaining vessel, drawing off the crude mercaptobenzthiazol thus formed, and working it up in the usual manner.

4. Process according to claim 3 in which the solution of sulphur in carbon disulphide and the aniline oil are separately supplied to a tube, extending downwards through the pressure vessel, the said liquids mixing in the said tube and issuing as a mixture at the base of the pressure vessel.

5. Process of manufacturing mercaptobenzthiazol consisting in continuously introducing a solution of sulphur in carbon disulphide mixed with aniline oil into a reaction vessel heated to 200-275° C., and allowing the mixture on the completion of the reaction to continuously overflow into a second chamber disposed in the reaction chamber whence it is drawn off and regulating the quantity of the mixture admitted to the reaction vessel to give the necessary time for the reaction to be completed immediately prior to its overflowing into the said second chamber.

6. Process of manufacturing mercaptobenzthiazol consisting in continuously introducing a solution of sulphur in carbon disulphide mixed with aniline oil through an adjustable inlet at the base of a cylindrical pressure sustaining vessel heated to 200-275° C., continuously causing the solution to rise in the said vessel and to overflow, when the reaction is complete, into a second cylindrical draw-off chamber disposed in the pressure sustaining vessel, drawing off the crude mercaptobenzthiazol thus formed, and working it up in the usual manner.

7. The process of continuously producing mercaptobenzthiazol by a reaction in the liquid phase under substantially uniform, superatmospheric pressure which comprises continuously introducing reactants into a liquid reaction mixture maintained at reaction temperature, maintaining a body of gases positioned above and in contact with said liquid reaction mixture to control the pressure under which reaction is effected, reacting together said reactants in the liquid mixture, and continuously removing reaction products thus produced from the liquid reaction mixture.

8. The process of continuously producing mercaptobenzthiazol by a reaction in the liquid phase under substantially uniform, elevated pressure which comprises continuously introducing the reactants into a liquid reaction mixture maintained at reaction temperature, maintaining a body of gases positioned above and in contact with said liquid reaction mixture to control the pressure under which reaction is effected, reacting together said reactants in the liquid mixture, and removing excess gas from said body of gases to maintain the pressure substantially constant, and continuously removing the reaction products thus formed from the liquid reaction mixture.

9. The process of continuously producing mercaptobenzthiazol by a reaction in the liquid phase under substantially uniform elevated pressures which comprises forming a vertical column of a liquid reaction mixture, heating to and maintaining at reaction temperature the said liquid reaction mixture, forming and maintaining a body of gases at suitable pressures above said vertical column, thus effecting reaction within said liquid reaction mixture, introducing a liquid mixture of reactants at the bottom of said vertical column and removing the reaction products at the top of said vertical column.

10. The process of continuously producing mercaptobenzthiazol by a reaction in the liquid phase under substantially uniform elevated pressures which comprises forming a vertical column of a liquid reaction mixture, heating to and maintaining at reaction temperature the said liquid reaction mixture, forming and maintaining a body of gases at suitable pressure above said vertical column thus effecting reaction within said liquid reaction mixture, continuously introducing a liquid mixture of reactants at the bottom of said vertical column, thus replenishing the said liquid reaction mixture with the necessary reactants and causing the reaction products to overflow at the top of said vertical column.

11. The process of continuously producing mercaptobenzthiazol by a reaction in the liquid phase under substantially uniform elevated pressures which comprises forming a vertical column of a liquid reaction mixture, heating to and maintaining at reaction temperature the said liquid reaction mixture, forming and maintaining a body of gases at suitable pressure above said vertical column thus effecting reaction within said liquid reaction mixture, introducing a liquid mixture of reactants at the bottom of said vertical column, the rate of introduction of said liquid mixture of reactants and the height of said vertical column being so adjusted and correlated that the said reaction is substantially complete in the liquid mixture overflowing at the top of said vertical column.

12. The process of continuously producing mercaptobenzthiazol by a reaction in liquid reaction mixtures under substantially uniform elevated pressures, the said liquid reaction mixture liberating gaseous bodies during said reaction, which comprises forming a vertical column of a liquid reaction mixture, heating to and maintaining at reaction temperature the said liquid reaction mixture, forming and maintaining a body of gases at suitable elevated pressures above said vertical column, thus effecting reaction within said liquid reaction mixture under pressure, continuously introducing a liquid mixture of reactants at the bottom of said vertical column, gradually removing gases from said body of gases to maintain the pressure substantially constant and compensate for the gases liberated from said liquid reaction mixture, and removing liquid reaction products at the top of said vertical column.

13. In the manufacture of mercaptobenzthiazol by a continuous process, the process which comprises continuously introducing a liquid mixture of sulphur, carbon disulphide and aniline oil as reactants into a liquid reaction mixture comprising the same reactants, maintained at temperatures between 200 and 275° C., maintaining a body of gases, comprising mainly hydrogen sulphide, under pressure and positioned above and in contact with said liquid reaction mixture to control the pressure under which reaction is effected, reacting together said reactants in the said liquid mixture, and continuously removing reaction products thus produced from the liquid reaction mixture.

14. In the manufacture of mercaptobenzthiazol by a continuous process, the process which comprises forming a vertical column of a liquid reaction mixture comprising sulphur, carbon disulphide and aniline, heating to and maintaining at temperatures between 200 to 275° C. the said liquid reaction mixture, forming and maintaining a body of gases under elevated pressure above said vertical column, the said body of gases comprising principally hydrogen sulphide, thus effecting reaction within said liquid reaction mixture, dissolving sulphur in carbon disulphide, mixing aniline oil with the solution thus produced to form a liquid mixture of reactants, introducing the said liquid mixture of reactants at the bottom of said vertical column, removing gases from the said body of gases to maintain the pressure substantially constant, and removing liquid reaction products, principally mercaptobenzthiazol, at the top of said vertical column.

15. In the manufacture of mercaptobenzthiazol by a continuous process, the process which comprises forming a vertical column of a liquid reaction mixture comprising sulphur, carbon disulphide and aniline, heating to and maintaining at temperatures between 200 to 275° C. the said liquid reaction mixture, forming and maintaining a body of gases under elevated pressure above said vertical column the said body of gases comprising principally hydrogen sulphide, thus effecting reaction within said liquid reaction mixture, dissolving sulphur in carbon disulphide, mixing aniline oil with the solution thus produced to form a liquid mixture of reactants, passing the said liquid mixture of reactants out of contact but in a heat exchanging relation through said heated liquid reaction mixture, to preheat and bring to reaction temperature the said liquid mixture of reactants, introducing the said preheated liquid mixture of reactants at the bottom of said vertical column, thus replenishing said liquid reaction mixture with the necessary reactants and causing the liquid reaction products formed by said reaction to overflow at the top of said vertical column.

In testimony whereof I affix my signature.
KENNETH HERBERT SAUNDERS.